INVENTORS:
JOHANNES E. RIJNSDORP
JOHANNES A. VAN KAMPEN
HANS BOLLEN
BY: *N. N. Kunetz*
THEIR ATTORNEY INVENTORS:
JOHANNES E. RIJNSDORP
JOHANNES A. VAN KAMPEN
HANS BOLLEN
BY:
THEIR ATTORNEY INVENTORS:
JOHANNES E. RIJNSDORP
JOHANNES A. VAN KAMPEN
HANS BOLLEN
BY: *[signature]*
THEIR ATTORNEY INVENTORS:
JOHANNES E. RIJNSDORP
JOHANNES A. VAN KAMPEN
HANS BOLLEN
BY:
THEIR ATTORNEY

United States Patent Office 3,415,720
Patented Dec. 10, 1968

3,415,720
APPARATUS FOR THE AUTOMATIC CONTROL OF A CONTINUOUS DISTILLATION OPERATION FOR MAINTAINING A CONSTANT RATIO OF BOTTOM PRODUCT FLOW TO HEAT INPUT FLOW
Johannes E. Rijnsdorp, Johannes A. Van Kampen, and Hans Bollen, Amsterdam, Netherlands, assignors to Shell Oil Company, New York, N.Y., a corporation of Delaware
Filed Oct. 19, 1965, Ser. No. 497,716
Claims priority, application Netherlands, Oct. 28, 1964, 6412525
6 Claims. (Cl. 202—181)

The invention relates to a method and apparatus for automatically controlling a continuous distillation process for the separation of a feed stream into a top and a bottom product stream in a column where reflux and re-evaporation are applied and wherein the quality of the two product streams is controlled.

It often occurs in technical practice that both the top product and the bottom product withdrawn from a continuous distillation have to meet specific requirements as regards quality. For example, it may be required that the top product contain no more than a specified small amount of impurity, while the bottom product should, as far as possible, be free from the principal constituent of the top product. An example of such a situation in the oil industry is the removal of a valuable light product such as isopentane from a mixture of hydrocarbons where the purity of the isopentane should be at least 97% and where the bottom product may not contain more than 2% isopentane.

A method wherein the quality of the two product streams is controlled is shown, for example, in U.S. Patent Ser. No. 2,885,863, issued May 12, 1959, to D. F. Berger. According to the method shown in the patent, the quality of the top product is measured and the signal thus obtained is used to adjust the feed flow; the quality of the bottom product is measured and the signal thus obtained is used to adjust the bottom product flow; and a signal derived from the pressure drop through the column is used to adjust the reflux flow. A disadvantage of this mode of control is that the adjustment of the particular parameters to a specific ratio between the vapor flow and the liquid flow in the rectifying section of the column in order to maintain the quality of the top product can only take place by simultaneously disturbing the ratio between the vapor flow and the liquid flow in the stripping section of the column, thereby causing the quality of the bottom product to begin to deviate from the desired value. This change in the vapor-liquid flow ratio in the stripping section of the column is caused by a strong dynamic coupling between the two sections of the column. Since, according to the method disclosed in the patent, when the ratio between the vapor flow and the liquid flow in the rectifying section must be changed due to a deviation of the quality of the top product from the desired value, the change is effected by changing the degree of re-evaporation via the liquid level in the bottom of the column, which in turn is influenced by the feed flow. No arrangement, however, has been made by which the ratio between the vapor flow and the liquid flow in the stripping section of the column can be maintained at the desired value. Instead, the meter or analyzer for the quality of the bottom product must first measure the deviation of that quality and only after such a deviation determination is made is the desired ratio restored, albeit slowly. As a result, the quantity of bottom product of the desired quality decreases considerably.

The invention provides the means whereby the coupling between the stripping section of the column and the rectifying section at a control action in the rectifying section is substantially obviated.

The process according to the invention therefore relates to the method and apparatus for the automatic control of a continuous distillation process for the separation of a feed stream into a top and a bottom product stream in a column where reflux and re-evaporation are applied, whereby the quality of the two product streams may be controlled, and whereby at a control action for keeping the quality of the top product constant the ratio between the vapor flow and the liquid flow in the stripping section of the column remains entirely or substantially unchanged.

As in conventional control systems, when a control action is necessary in order to keep the quality of the top product constant, a change is made in the ratio between the vapor flow and the liquid flow in the rectifying section of the column. This may be a temporary change which is required only as long as the influence of a disturbance of the equilibrium is active. According to the invention, at such a control action the ratio between the vapor flow and the liquid flow in the stripping section remains entirely or substantially unchanged. As a result, the quality of the bottom product is not disturbed.

According to a further characteristic of the invention, in the control system for keeping the ratio between the vapor flow and the liquid flow in the stripping section of the column constant use is made of signals derived from one or more flow meters, heat flow meters and/or liquid level gauges. Owing to the use of such instruments, the maintenance of the ratio between the vapor flow and the liquid flow in the stripping section of the column is effected in a direct manner, namely, by measuring flow and level parameters. In this manner a very rapid response to the control action for keeping the quality of the top product constant is obtained, resulting in the quality of the bottom product remaining entirely or substantially unchanged. Thus, for maintaining the ratio between the vapor flow and the liquid flow in the stripping section of the column at a control action for keeping the quality of the top product constant, a quality meter or analyzer and a quality controller for the bottom porduct are not required. However, it may be desirable to nevertheless apply such a meter and controller in a cascade circuit. With such a cascade circuit, it is ensured that the equalibrium conditions are kept at the correct values, so that changes that can have a lasting influence on the quality of the bottom product, for example, a change of the composition of the feed, result in readjustment of the ratio between the vapor flow and the liquid flow in the stripping section of the column. This extra control action for the purpose of keeping the quality of the bottom product constant has no adverse influence on the dynamic behavior of the control system according to the invention and forms no part of the invention.

The invention will be more clearly understood from the following detailed description of the invention when taken in conjunction with the accompanying drawings wherein.

Figure 1:
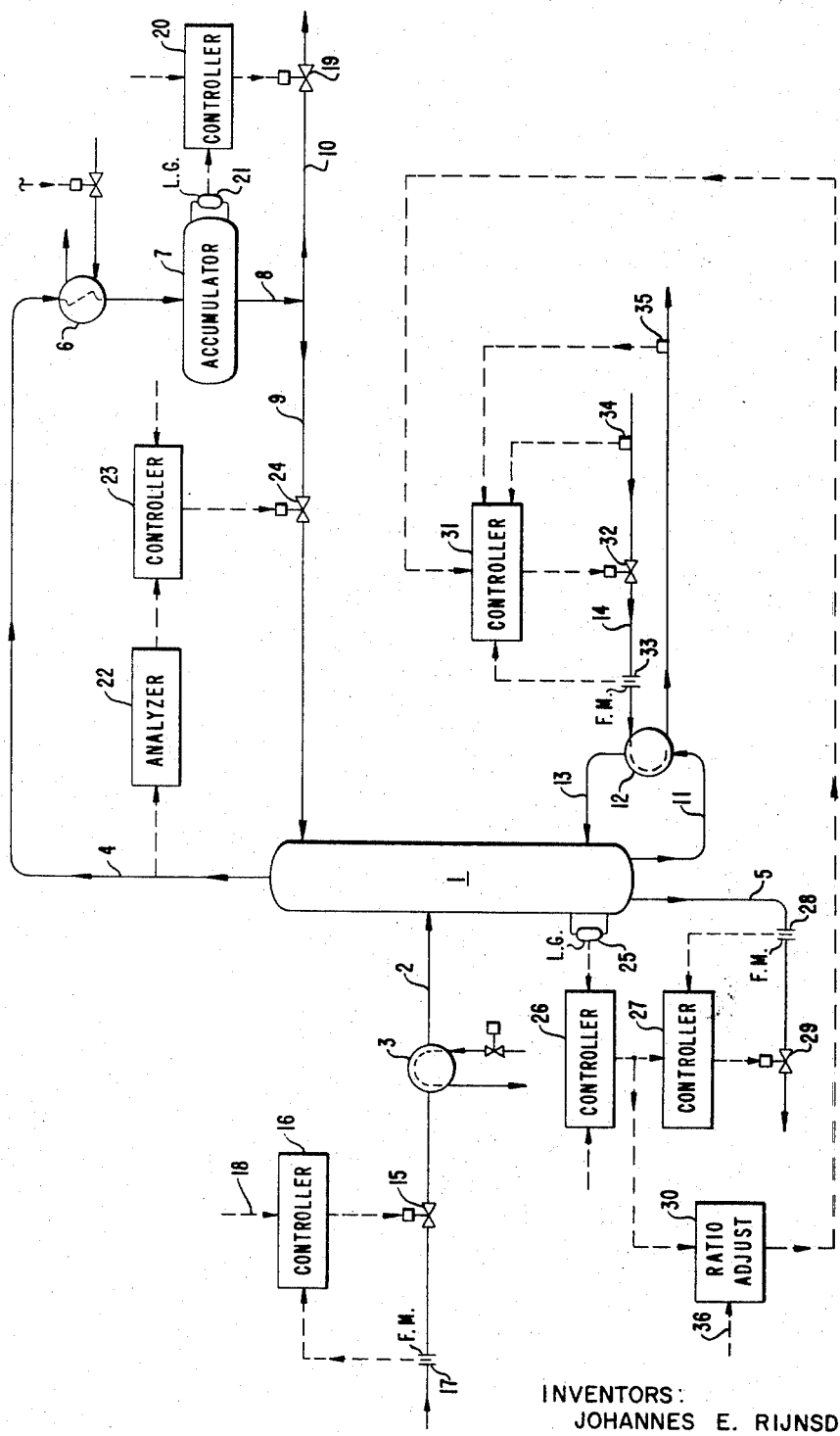
FIGURE 1 is a diagrammatic representation of a control system according to the invention for a distillation apparatus wherein the feed flow to the distillation column is maintained at an independent value.

A control method according to the invention that can be used to good advantage consists of maintaining the feed flow at an independently controlled value; adjusting the reflux flow and the top product flow in such a way that the quality of the top product is maintained at a desired value and the liquid level in the top accumulator is maintained within desired limits; and maintaining the ratio between the heat flow to the column reboiler and the bottom product flow at a desired value by means of a signal derived from the liquid level in the bottom of the column in such a way that both the heat flow and the bottom product flow increase at a rise in that liquid level and vice versa.

The apparatus for carrying out the distillation process control scheme mentioned above is illustrated in FIGURE 1 wherein there is shown a distillation column 1 of any suitable design which contains vapor-liquid contacting elements, such as a vertical series of bubbles or valve trays. The feed is continually introduced in either a liquid or vapor form into the column 1 to an intermediate stage through a pipeline 2 containing a preheater 3 if such is required; the top product in the vapor phase is discharged through a pipeline 4; and the liquid bottom product is discharged through a pipeline 5.

Connected to the top product column discharge line 4 is a condenser 6 which condenses the vapor in the line 4; the condensate then flows into a top product accumulator 7. The condensate collected in the accumulator is discharged through a pipeline 8 and a portion of the condensate is returned to the top of the column 1 for reflux by a pipeline 9, while the remainder of the discharged condensate is passed through a discharge pipeline 10 as the liquid top product output stream from the distillation process.

Re-evaporation for the column 1 is effected by passing a stream of liquid from the bottom of the column via a pipeline 11 to a reboiler 12 which may, for example, be a heat exchanger, and returning the heated stream via a pipeline 13 to the column 1. Heat is supplied to the reboiler 12 via a pipeline 14. The particular manner in which re-evaporation is attained, however, forms per se no part of this invention since re-evaporation may be accomplished in other ways, e.g., with a heating coil in the bottom of the column.

Turning now to the control of the distillation process shown in FIGURE 1, as indicated above, this particular control scheme is for a process wherein the feed flow rate is maintained at an independently controlled value. Accordingly, the feed flow line 2 is provided with a control valve 15, the position of which is controlled or adjusted by means of a controller 16. The controller 16 compares the measured value of the feed flow rate, as determined by flow meter 17 connected in the flow line 2, with a signal related to the desired value of the feed flow rate, i.e., the set value of the controller 16. The set value input signal of controller 16, and of all other controllers shown in the drawings which do not have set values which are adjusted by a process variable, is indicated by means of an arrow 18. Any differences resulting from the comparison by the controller 16 will cause the output signal from the controller 16 to adjust the value 15 in a manner to decrease the difference. Thus, by selecting the set value of controller 16, the desired feed flow rate for the distillation process may be maintained.

The top liquid product stream flow rate is adjusted by means of a controllable valve 19 connected in the pipeline 10. The valve 19 is controlled by means of a controller 20 which compares the measured value of the liquid level in the accumulator 7, as determined by the liquid level gauge 21, with a signal proportional to the desired level in the accumulator, i.e., the set value of the controller. The controller 20 attempts to keep the liquid level in the accumulator within desired limits and hence any differences resulting from the comparison will produce an output signal from the controller 20 which tends to adjust the valve 19 in such a way that the difference is decreased. Thus, if at a given moment the measured value of the accumulator level is larger than the set or desired value, the signal supplied from the controller 20 tends to open the valve 19 wider.

The amount of reflux for the column 1 is controlled by means of a quality measuring instrument analyzer 22 of any suitable design which analyzes the quality of the top products and transmits a signal corresponding to the separation to a controller 23 wherein the measured and desired qualities of the top product are compared. The output signal from the controller 23 is coupled to a control valve 24 in the pipeline 9 and adjusts the valve 24 to a position where the reflux flow rate will cause the distillation process to produce a top product of the desired quality. Although the analyzer 22 is shown as analyzing a sample of the top product flowing in the overhead vapor line 4, it is understood by those skilled in the art that the sample can equally well be taken from the pipeline 9 or from one of the upper plates in the column. It is also noted that the disclosed control loops for maintaining the quality of the top product and the liquid level in the accumulator are old and well known in the art and are used for illustrative purposes only. Accordingly, other known variations of these control loops may be used within the scope of the invention.

In order to maintain the desired constant ratio between the vapor flow and liquid flow in the stripping section of the column and hence maintain a constant quality for the bottom product upon a control change for maintaining the top product quality, a control system is provided, according to this embodiment of the invention, wherein the change in the liquid level in the bottom of the column directly varies both the bottom product stream flow rate and the quantity of heat supplied to the reboiler for re-evaporation. According to this control scheme, the liquid level in the bottom of the column 1 is detected by a liquid level gauge 25, the output of which is connected to the input of a level controller 26 which has a set value corresponding to the desired column bottom liquid level. The output of controller 26 is connected to the set value input of a flow controller 27 which has its normal input connected to the output of a flow meter 28 for the bottom product stream flow, and its output connected to a control valve 29 in the bottom product flow line 5. Accordingly, any change in the column bottom liquid level will immediately cause a corresponding change in the bottom product stream flow rate via an adjustment of the valve 29, i.e., a rise in the liquid level will cause a rise in bottom product flow and vice versa. The output of the level controller 26 is also connected via a ratio adjusting device 30 to the set value input of a heat controller 31 whose output is connected to a control valve 32 for controlling the flow of the heating medium in flow line 14. The normal input of the controller 31 is connected to the output of a flow meter 33 for measuring the flow of heating medium in the flow line 14. Since the function of the controller 31 according to the invention is to control the quantity of heat supplied to the reboiler 12, the controller 31 is preferably supplied with two more inputs for signals which originate from transducers 34 and 35 and correspond respectively to the specific enthalpy of the heating medium before and after passing through the reboiler 12. From the combination of these signals with that from flow meter 33, controller 31, in a manner which in itself is well known, forms a signal that corresponds to the heat flow through the reboiler 12 to the column. If the heating medium through flow line 14 has a constant enthalpy, for example, oil of a constant temperature or steam of a constant temperature and pressure, then the signal from flow meter 33 is generally sufficient for the proper operation of controller 31.

The ratio adjusting device 30, which may, for example, be a variable attenuator or signal divider, produces an output signal which is related to the input signal thereto by a fixed ratio; the particular ratio being determined by the value of the control input 36 to the device 30. With ratio adjusting device 30 the ratio between the signals for the set values of controllers 27 and 31 can be set to the desired predetermined value, which will result in the desired quality of the bottom product. It is also possible for this ratio to be determined by a quality meter or analyzer and quality controller for the bottom product (not shown) which control the setting of the ratio device 30.

In order to attain a better understanding of the operation of the invention, a hypothetical control problem is presented. If it becomes necessary in order to maintain the quality of the top product to increase the reflux via control valve 24, then the flow of liquid through the column and, hence, in the stripping section, is increased, causing an increase in the liquid level in the bottom of the column. Owing to the rise in the liquid level in the bottom of the column, more heat is at once transferred to the reboiler 12 via the control loop formed by controller 26, ratio device 30 and controller 31, causing more vapor to be passed through flow line 13 to the stripping section of the column. Additionally, the bottom product flow via the control loop formed by flow meter 28, controller 27 and valve 29 is increased to reduce the liquid level in the column bottom. In consequence thereof, the ratio between the vapor flow and liquid flow in the stripping section of the column is restored. Conversely, any decrease in the reflux flow will cause corresponding decreases in the bottom product and heat flows. Any action of the top product quality analyzer 22 is, therefore, followed by a rapid response of the control circuits described hereinbefore for the stripping section of the column, owing to which the ratio between vapor flow and liquid flow in that section continually remains at the desired value.

A modification of the control scheme shown in FIGURE 1 is obtained by adjusting the controller for the heat flow to the reboiler under the direct influence of a signal derived from the liquid level in the bottom of the column in such a way that the heat flow increases upon a rise in that liquid level and vice versa, and adjusting the bottom product stream flow rate to maintain the ratio between the bottom product flow rate and the heat flow to the reboiler at a desired value.

Figure 2:
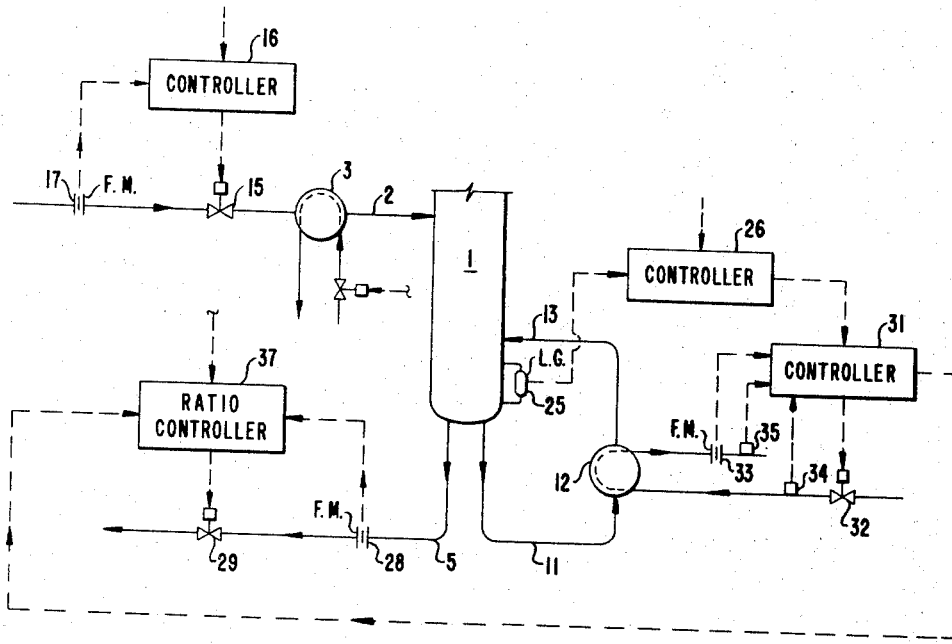
FIGURES 2 and 3 are modifications of the control scheme shown in FIGURE 1.

An example of this modification is represented in FIGURE 2. In this and also in any following figure structures previously used are denoted by like numerals. According to this modification, the output signal from the level controller 26 is fed directly to the set value input of the heat controller 31 while the controller 27 and the ratio adjusting device have been replaced by a ratio controller 37, the set value of which is the desired ratio between the bottom product stream flow and the heat flow to the reboiler. Here again, as with the control scheme of FIGURE 1, a larger flow of liquid in the column is at once compensated by a larger vapor flow, while the ratio controller 37 provides for the correct bottom product flow to control the liquid level in the column bottom. The set value of controller 36 may also be determined by a quality analyzer and quality controller for the bottom product (not shown).

Another modification of the control scheme of FIGURE 1 is obtained by directly adjusting the bottom product flow to maintain the liquid level in the column bottom within desired limits, while the heat flow is adjusted in accordance with bottom product flow change to maintain the ratio between the bottom product flow and the heat flow to the reboiler at a desired value.

Figure 3:
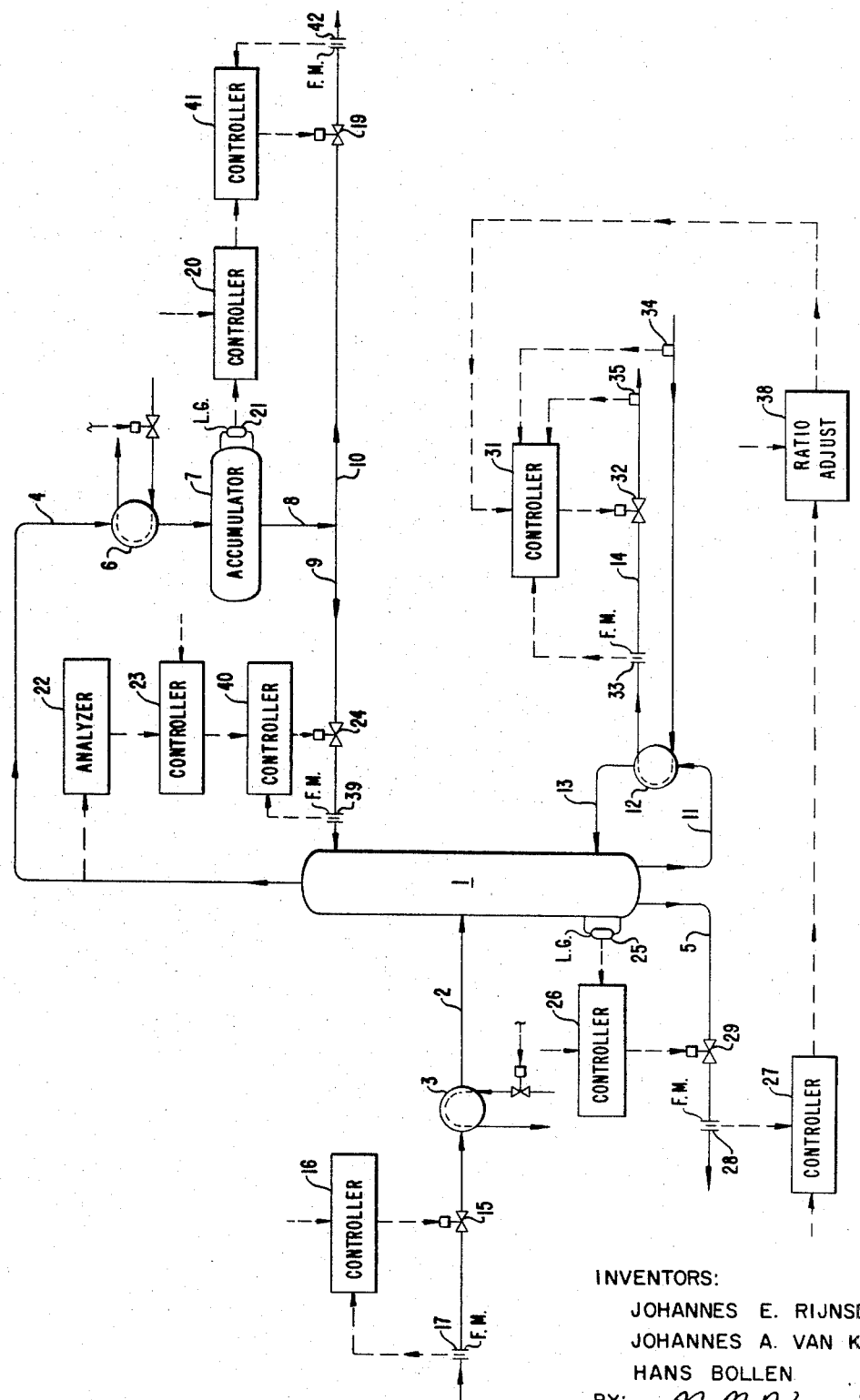

An example of this modification is represented in FIGURE 3. Adaptation of the vapor flow in the stripping section of the column when in response to a control action at the top of the column the liquid flow is changed takes place via liquid level gauge 25, controller 26 and valve 29 which adjust the bottom product stream flow to maintain the desired liquid level in the column bottom. The change in bottom product flow adjusts the set value of controller 31 to the desired value via flow meter 28, flow controller 37 and ratio adjusting device 38. Ratio device 38 is similar to device 30 and is used to adjust the ratio between the bottom product flow and the heat flow through the reboiler, which ratio corresponds to the ratio between the vapor flow and the liquid flow in the stripping section of the column to the desired predetermined value.

For the control of the quality of the top product and of the liquid level in the top product accumulator 7, in FIGURE 3 a variant of the control scheme shown in FIGGURE 1 is represented, which variant is known in the art and comprises application of cascade circuits for the adjustment of the reflux flow and of the top product flow. For this purpose, a flow meter 39 and flow controller 40 are added for control of the reflux flow with the set value of the controller 40 being supplied by the quality controller 23. Moreover, a flow meter 41 and flow controller 42, the set value for which is supplied by the level controller 20, are supplied for controlling the top product flow.

The examples described so far have all related control systems where the feed flow can be adjusted independently, a situation which in practice is often found desirable. However, it is also often desirable that there be a possibility of adjusting the top product flow independently, for example, when that flow constitutes the feed for a following process, the feed flow for which should have a specified value. A control method according to the invention can provide for this variant by maintaining the top product flow at an independent value, by adjusting the reflux flow and the heat flow to the reboiler in such a way that the quality of the top product is maintained at a desired value and the liquid level in the top accumulator is maintained within desired limits, by adjusting the feed flow to maintain the desired liquid level in the column bottom in such a way that the feed flow increases upon a drop in the colume bottom liquid level and vice versa, and by adjusting the bottom product flow to maintain the ratio between the bottom product flow and the heat flow to the reboiler at a desired value.

Figure 4:
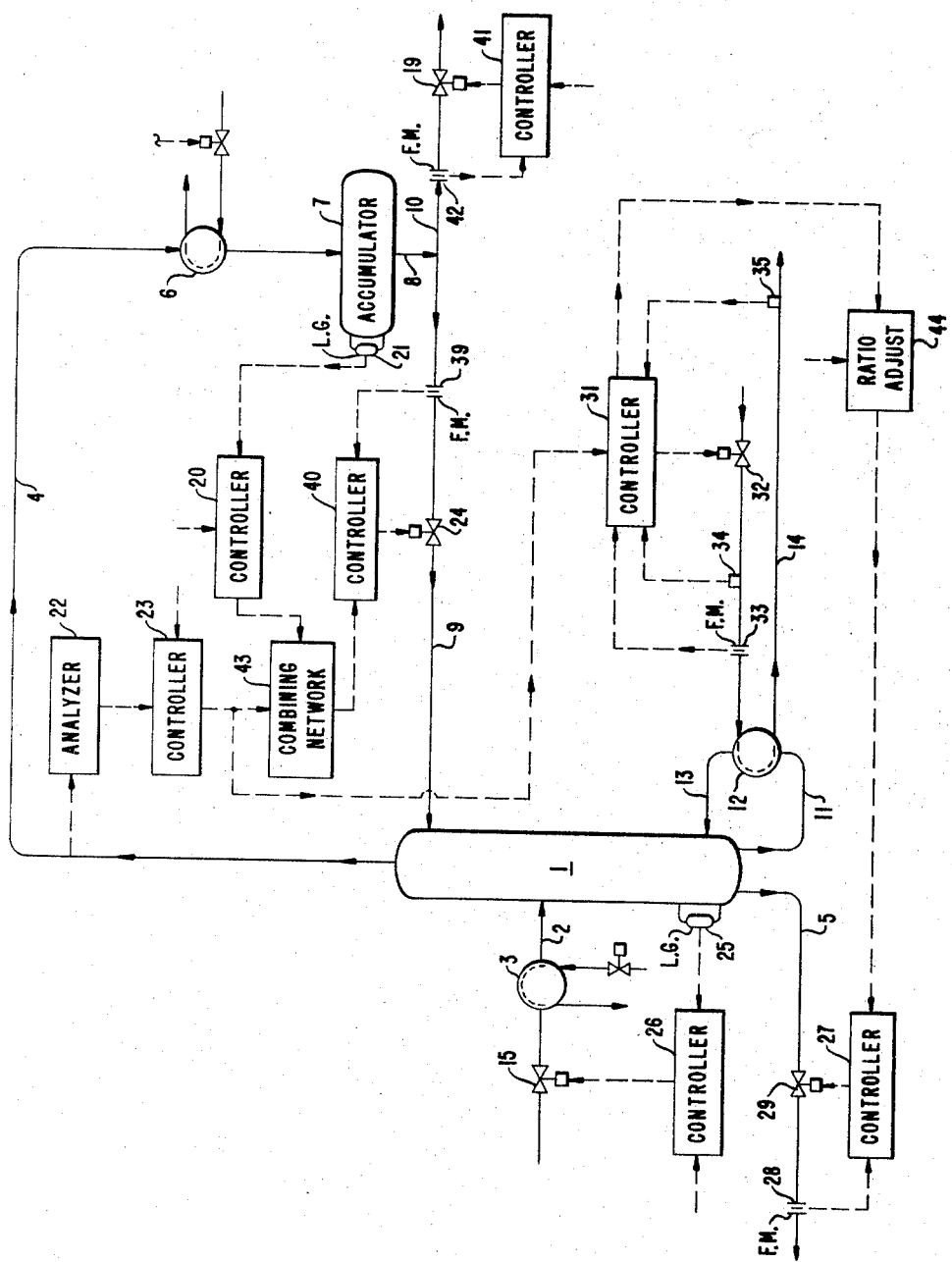
FIGURE 4 is a diagrammatic representation of a control system according to the invention for a distillation apparatus wherein the top product stream is maintained at an independent value.

An example of this variant is represented in FIGURE 4 wherein the top product flow is independently controlled by means of controller 41 and flow meter 42. According to this control scheme, the output signals from level controller 20 and from quality controller 23 are combined in network 43, which, for example, may be an adding network, and the output thereof is connected to the set value input of controller 40 to control the reflux flow via valve 24 to maintain the desired liquid level in accumulator 7 and to attempt to maintain the quality of the top products. However, the output signal from quality controller 23 also passes to the input for the set value of the heat flow controller 31. Accordingly, if the quality of the top product does not meet the desired requirement, this may lead, for example, to the control valve 32 being farther opened by the controller 31, resulting in more vapor being introduced into the column via line 13. Owing to the increased vapor in the column, the quality of the top product will again be restored. However, in order to prevent the vapor-to-liquid flow ratio in the stripping section of the column from varying, an output signal from controller 31, corresponding to the increased heat flow through reboiler 12 is fed via ratio device 44 to the input for the set value of flow controller 27, causing the bottom product flow to increase and resulting in the level of the liquid in the column bottom dropping. The drop in the liquid level in turn causes level gauge 25 and controller 26 to increase the feed flow through line 2 to the column, resulting in the ratio between the vapor flow and the liquid flow in the stripping section being restored. Ratio adjusting device 44 adjusts the ratio between the heat flow through reboiler 12 and the bottom product stream flow through flow line 5, which ratio corresponds to the ratio between the vapor flow and the liquid flow in the stripping section of the column, to the predetermined value. The setting of the ratio device 44 may be derived from a quality meter for the bottom product, but this possibility is not further shown in the figure. With the control scheme just described, any change in the liquid flow in the stripping section is rapidly compensated for by an opposite change in the feed flow, resulting in the liquid flow in that section and, hence, the ratio between the vapor flow and the liquid flow therein, remaining unaltered.

A control scheme according to the invention can also be provided for the variant whereby the reflux flow is adjusted at an independently controlled valve. This may be of importance in view of properties of the column, for example, when the reflux is adjusted so as to give the maximum production. This variant of the invention is provided by maintaining the reflux flow at an independently controlled value while the top product flow and the heat flow to the reboiler are adjusted in such a way that the quality of the top product is maintained at a desired value and the liquid level in the top accumulator is maintained within desired limits. Furthermore, the feed flow is then adjusted to maintain the desired column liquid level under the influence of a signal derived from the liquid level in the column bottom in such a way that the feed flow increases upon a drop in that liquid level and vice versa, while the ratio between the bottom product flow and the heat flow to the reboiler is maintained at a desired value.

Figure 5:
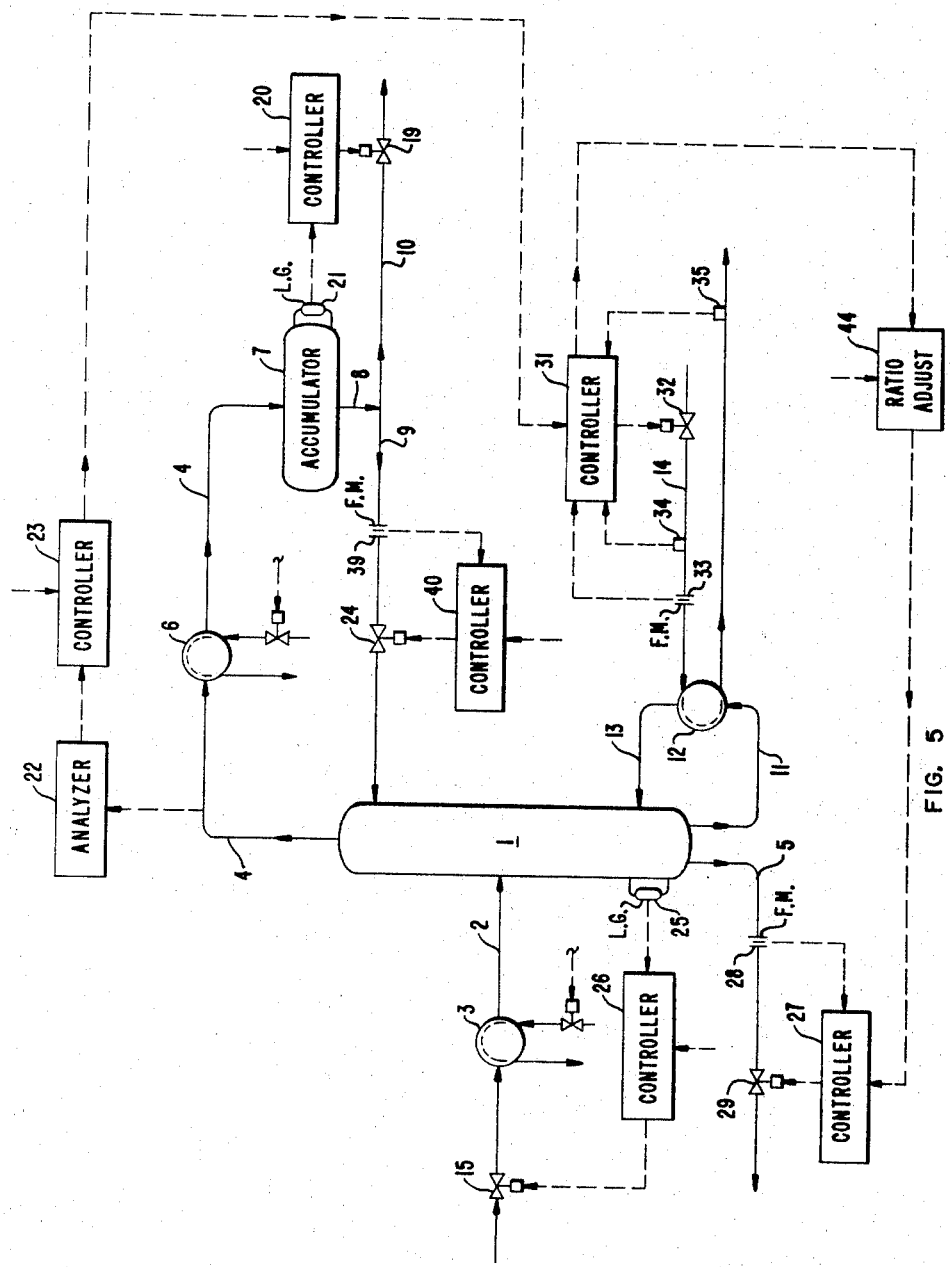
FIGURE 5 is a diagrammatic representation of a control system according to the invention for a distillation apparatus wherein the reflux flow is maintained at an independent value.

An example of this method of control is represented in FIGURE 5. As can easily be seen, this control scheme differs from that of FIGURE 4 only in that the liquid level in the top product accumulator is maintained between the desired limits by adjusting the top liquid product stream flow via the control loop formed by gauge 21, controller 20 and control valve 19 and in that the reflux flow is not used for control of the top product quality but is maintained at an independently controlled value by means of flow meter 39, controller 40 and valve 24. The explanation of the mode of operation as regards the change in the vapor flow to maintain the ratio in the stripping section of the column entirely corresponds to that given with regard to FIGURE 4. Here the reflux flow is not used for control of the quality of the top product.

The control scheme according to the invention can also be provided for the variant whereby the bottom product flow is maintained at an independently controlled value. This type of control scheme is of importance, for example, if bottom product flow constitutes the feed for a following process for which the feed flow must have a specified value. This variant of the invention is provided by maintaining the bottom product stream flow at an independently controlled value, while the reflux flow and the top product flow are adjusted in such a way that the quality of the top product is maintained at a desired value and the liquid level in the top accumulator is maintained within desired limits. Moreover, the liquid level in the bottom of the column is mantained by adjusting the feed flow under the influence of a signal derived from the liquid level in the column bottom in such a way that the feed flow increases upon a drop in the column bottom liquid level and vice versa, while the ratio between the bottom product flow and the heat flow to the reboiler is maintained at the desired value from maintaining the quality of the bottom product.

Figure 6:
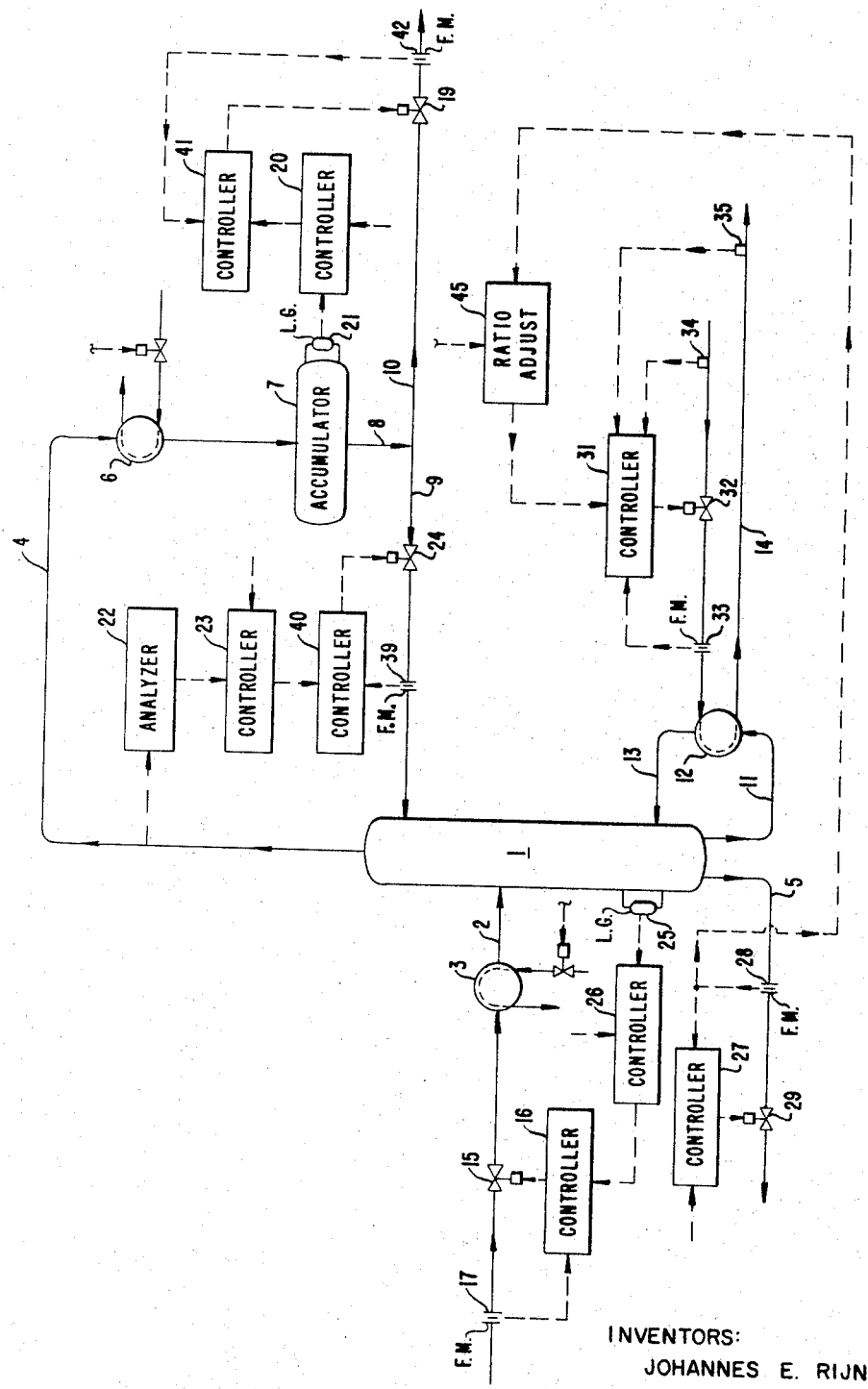
FIGURE 6 is a diagrammatic representation of a control system according to the invention for a distillation apparatus wherein the bottom product flow is maintained at an independent value.

An example of this variant is represented in FIGURE 6. As shown in the figure, the quality of the top product is maintained by means of a conventional control loop, i.e., analyzer 22, controllers 23 and 40 and control valve 24, for adjusting the reflux flow, while the liquid level in the accumulator 7 is maintained within desired limits by adjusting the top liquid product flow via gauge 21, controllers 20 and 41 and control valve 19. The liquid level in the bottom of the column is maintained at a desired value by a control loop, including gauge 25, controllers 26 and 16 and valve 5, which tends to decrease the feed flow stream upon a rise in the liquid level in the bottom of the column and vice versa. The bottom product stream flow is controlled to an independent value by the control including controller 27, flow meter 28 and valve 29. The output signal from flow meter 28 is also fed via ratio adjusting device 45 to the set value input of heat controller 31 which controls the quantity of heat supplied to the reboiler 12. Ratio adjust device 45 is set to adjust the ratio between the bottom product flow and the heat flow through the reboiler 12 to the desired value to maintain the quality of the bottom product. If desired that set ratio of the device 45 can be adjusted under the influence of a signal derived from the quality of the bottom product, but this possibility is not further indicated in the figure. It should be noted that since the bottom product flow is adjusted independently and, in many cases, is then kept constant, device 45 can often be omitted with no adverse effect. For example, when the bottom product flow is adjusted to a constant value, the signal from meter 28 is not fed to controller 31, and the desired ratio between the bottom product flow and the heat flow to the reboiler is maintained by properly adjusting the set value of controller 31. If the reflux flow increases as a result of a control action for the purpose of maintaining the quality of the top product, then the liquid level in the bottom of the column rises. This results in the level gauge 25 and level controller 26 changing the set value of controller 16 and causes a decrease in the feed flow, owing to which the original ratio between vapor flow and the liquid flow in the stripping section of the column is restored. Conversely, a decrease in the column bottom liquid level will cause an increase in the feed flow.

Another important variant of the mode of control according to the invention is that whereby the heat flow through the reboiler is maintained at an independent value. This situation occurs, for instance, if use is made of a heat source whose magnitude is reduced owing to other circumstances, like heat withdrawn from another product stream.

Figure 7:
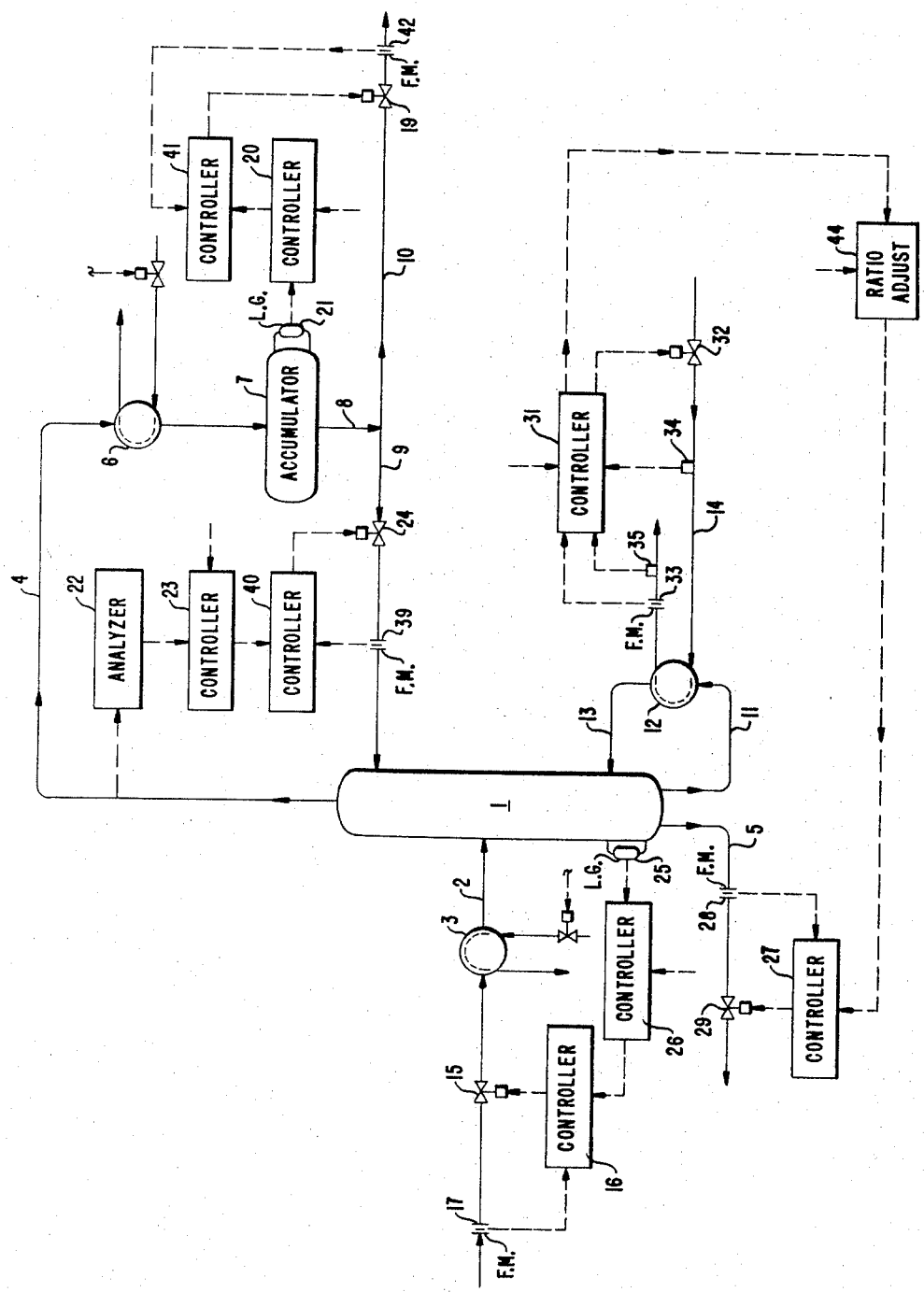
FIGURE 7 is a diagrammatic representation of a control system according to the invention for a distillation apparatus wherein the heat flow to the reboiler is maintained at an independent value.

According to the invention, the heat flow to the reboiler is then maintained at an independent value, while the reflux flow and the top product flow are adjusted in such a way that the quality of the top product is maintained at a desired value and the liquid level in the top accumulator is maintained within desired limits. Furthermore, the liquid level in the bottom of the column is maintained by adjusting the feed flow under the influence of a signal derived from the liquid level in the bottom of the column in such a way that the feed flow increases upon a drop in the liquid level and vice versa, while the ratio between the bottom product flow and the heat flow to the reboiler is maintained at the predetermined desired value. An example of this variant is represented in FIGURE 7. The explanation of the mode of operation thereof is entirely analogous to that given in relation to FIGURE 6 as far as the compensation for a change in the reflux flow is concerned. The size of the bottom product flow through flow line 5 is determined by the heat flow through reboiler 12 by passing an output signal corresponding to the heat flow to the reboiler 12 from controller 31 via ratio adjusting device 44 to the input for the set value of controller 27. The ratio between the bottom product flow and the heat supply is adjusted by means of device 45 to the desired value. If desired, a signal derived from a quality controller (not shown) for the quality of the bottom product can be used to set the device 45.

It is noted that in the aforementioned examples no means is indicated by which the flow of cooling medium through the condenser 6 and the flow of heating medium through the feed preheater 3 may be adjusted. These adjustments can be carried out by control schemes which in themselves are known in the art. For instance, these variables may be adjusted to control the pressure in the column or to optimize the heat economy of the process. These modes of control can be combined with the control method according to the invention.

It is understood that the control system mentioned in the foregoing may be pneumatic, hydraulic, electric, electronic or mechanical systems or may constitute mixtures of these types.

Obviously, various other modifications of the invention are possible in the light of the above teachings without departing from the spirit and scope of the invention. It is therefore understood that the invention is not limited to the particular forms illustrated but is capable of embodiment in other forms within the scope of the appended claims.

We claim as our invention:

1. Apparatus for the automatic control of a continuous distillation process for the separation of a feed stream into a top and a bottom product stream in a distillation column in which both reflux and re-evaporation are applied, comprising:
   a distillation column having a feed line and top and bottom product flow lines, an accumulator, said top product flow line being coupled to said accumulator;
   a top liquid product flow line, said top product liquid flow line being coupled to said accumulator;
   means responsive to the variation in the liquid level in said accumulator for adjusting the flow in said top liquid product flow line to maintain the accumulator liquid level within desired limits;
   an analyzer for continuously analyzing the quality of the top product withdrawn from said column;
   a reflux flow line coupled to said column and said accumulator;
   first control means responsive to the output signal from said analyzer for adjusting the flow in the reflux flow line to maintain the quality of the top product at the desired value;
   means for adjusting the flow in the feed line to a desired independently controlled value;
   a gauge for measuring the liquid level in the bottom of the column;
   a flow meter for measuring the flow in the bottom product flow line;
   a reboiler, said reboiler being coupled to said column to evaporate the portion of column liquid circulated through the reboiler;
   a source of heating medium, said source of heating medium being coupled to said reboiler;
   means for measuring the heat supplied to the column reboiler for evaporation; and
   second control means responsive to the output signals from said gauge, said flow meter and said heat measuring means for adjusting the flow in said bottom product flow line and the flow of said heating medium to maintain the column bottom liquid level between desired limits and to maintain a predetermined constant ratio between the bottom product stream flow and the heat flow to said reboiler.

2. The apparatus of claim 1 wherein said second control means comprises:
   a first controller responsive to the output of said liquid level gauge for determining the variation between the measured and desired liquid levels;
   a second controller having its input connected to the output of said flow meter and its set value input connected to the output of said first controller, the output of said second controller controlling the flow in the bottom product flow line;
   a third controller having its input connected to the output of said heat measuring means and its output connected to control the flow of heating medium to the reboiler; and
   means having its input connected to the output of said first controller for producing an output signal which is related to the input signal thereto by a fixed predetermined ratio, said output signal being fed to the set value input of said third controller.

3. The apparatus of claim 1 wherein said second control means comprises:
   a first controller responsive to the output of said liquid level gauge for determining the variation between the measured and desired liquid levels;
   a second controller having its input connected to the output of said heat measuring means, its set value input connected to the output of said first controller, and its output connected to control the flow of heating medium to said reboiler; and
   a ratio controller having its inputs connected to the outputs of said flow meter and said second controller, and its output connected to control the flow in the bottom product line.

4. The apparatus of claim 1 wherein said second control means comprises:
   a first controller responsive to the output of said liquid level gauge for determining the variation between the measured and desired liquid levels, and first controller having its output connected to control the flow in the bottom product line;
   a second controller responsive to the output of said flow meter for determining the variation between the measured and desired bottom product flows;
   a third controller having its input connected to the output of said heat measuring means and its output connected to control the flow of heating medium to the reboiler; and
   means having its input connected to the output of said second controller for producing an output signal which is related to the input signal thereto by a predetermined ratio, said output signal being fed to the set value input of said third controller.

5. Apparatus for the automatic control of a continuous distillation process for the separation of a feed stream into top and bottom product streams in a distillation column in which both reflux and re-evaporation are applied comprising:
   a distillation column having a feed line and top and bottom product flow lines, an accumulator, said top product flow line being coupled to said accumulator;
   a top product liquid flow line, said top product liquid flow line being coupled to said accumulator;
   means responsive to the liquid level in the bottom of the column for adjusting the flow in the feed line to maintain the column bottom liquid within desired limits;
   an analyzer for continuously analyzing the quality of the top product withdrawn from said column;
   a first controller for determining the variation between the measured and desired quality of the top product;
   a reboiler, said reboiler being coupled to said column to evaporate the portion of column liquid circulated through the reboiler;
   a source of heating medium, said source of heating medium being coupled to said reboiler;
   means for measuring the heat flow to the reboiler for re-evaporation;
   a second controller having its input connected to the output of said heat measuring means and its set value input connected to the output of said first controller, said second controller having its output connected to control the flow of heating medium to the reboiler;

a control valve disposed to control the flow in the bottom product line;

control means responsive to the output of said second controller for adjusting said bottom product control valve to maintain a constant predetermined ratio between the bottom product stream flow and the flow heating medium to the reboiler;

means for maintaining the flow in the top product liquid flow line at an independently controlled value;

a liquid level gauge for the top product accumulator;

a reflux flow line coupled to said column and said accumulator;

a third controller connected to the output of said liquid level gauge for determining the variation between the measured and desired liquid levels;

an adding network for adding the output signals from said first and third controllers; and means responsive to the output signal from said adding network for adjusting the flow in the reflux flow line.

6. Apparatus for the automatic control of a continuous distillation process for the separation of a feed stream into top and bottom product streams in a distillation column in which both reflux and re-evaporation are applied comprising:

a distillation column having a feed line and top and bottom product flow lines, an accumulator, said top product flow line being coupled to said accumulator;

a top product liquid flow line, said top product liquid flow line being coupled to said accumulator;

means responsive to the liquid level in the bottom of the column for adjusting the flow in the feed line to maintain the column bottom liquid level within desired limits;

an analyzer for continuously analyzing the quality of the top product withdrawn from said column;

a first controller for determining the variation between the measuring and desired quality of the top product;

a reboiler, said reboiler being coupled to said column to evaporate the portion of column liquid circulated through the reboiler;

a source of heating medium, said source of heating medium being coupled to said reboiler;

means for measuring the heat flow to the reboiler for re-evaporation;

a second controller having its input connected to the output of said heat measuring means and its set value input connected to the output of said first controller, said second controller having its output connected to control the flow of heating medium to the reboiler;

a control valve disposed in the bottom product line;

control means responsive to the output of said second controller for adjusting the control valve in said bottom product line to maintain a constant predetermined ratio between the bottom product flow and the flow of heating medium to the reboiler;

a reflux flow line coupled to said column and said accumulator;

means for maintaining the flow in said reflux flow line at an independently controller value; and means for adjusting the flow in the top product flow line to maintain the liquid level in the top product accumulator within desired limits.

References Cited

UNITED STATES PATENTS

| | | | |
|---|---|---|---|
| 2,882,693 | 4/1959 | Clay | 202—160 |
| 2,885,863 | 5/1959 | Berger | 62—32 |
| 2,976,234 | 3/1961 | Webber | 203—1 |
| 2,985,565 | 5/1961 | Bellinger | 202—160 |
| 2,990,437 | 6/1961 | Berger | 202—160 |
| 3,224,947 | 12/1965 | Lupfer | 202—160 |
| 3,259,554 | 7/1966 | Constantikes | 196—132 |
| 3,294,648 | 12/1966 | Lupfer | 203—2 |

WILBUR L. BASCOMB, JR., *Primary Examiner.*

U.S. Cl. X.R.

202—160, 206; 203—1, 3, 2; 196—141; 235—151.12